UNITED STATES PATENT OFFICE.

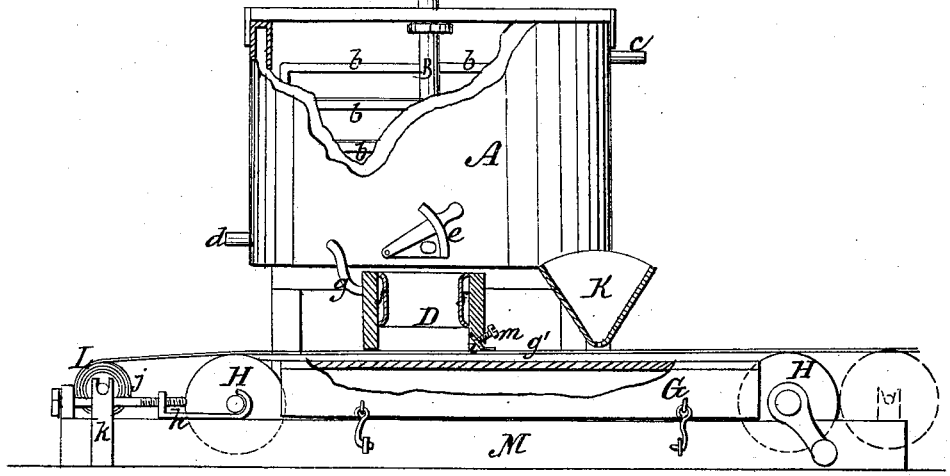
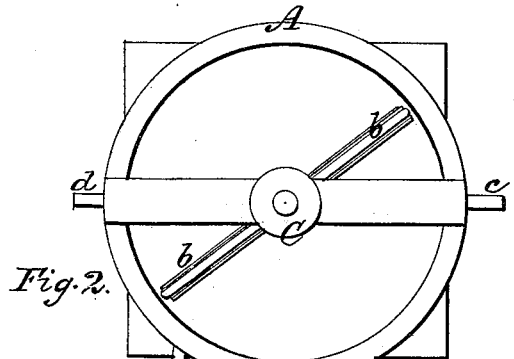
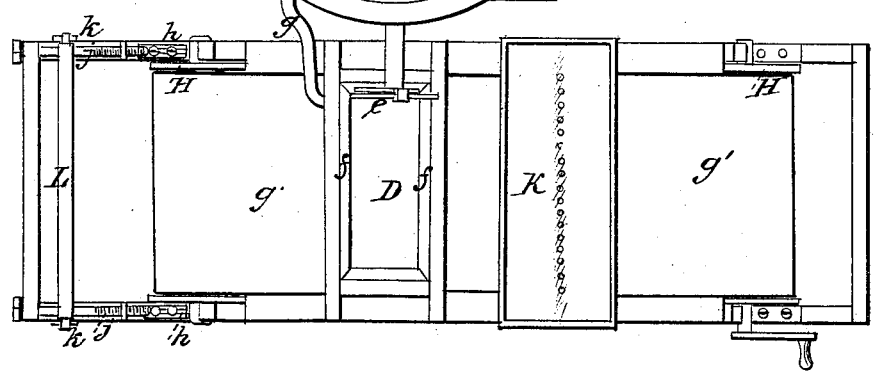

BENONI S. BROWN, OF BUFFALO, NEW YORK, ASSIGNOR TO HIMSELF AND LEWIS B. JOY, OF THE SAME PLACE.

Letters Patent No. 89,122, dated April 20, 1869.

IMPROVED MACHINE FOR COMPOUNDING AND APPLYING ROOFING-COMPOSITIONS TO FELT, PAPER, AND OTHER FABRICS.

The Schedule referred to in these Letters Patent and making part of the same.

*To all whom it may concern:*

Be it known that I, BENONI S. BROWN, of the city of Buffalo, in the county of Erie, and State of New York, have invented an Improved Machine for Compounding and Applying Roofing-Compositions on Felt, or other flexible material; and I hereby declare that the following is a full and exact description thereof, reference being had to the accompanying drawings, in which—

Figure 1 is a side elevation, with portions broken away, to show the internal construction.

Figure 2 is a plan view of the same.

Like letters indicate corresponding parts in both figures.

Hitherto the preparation and application of bituminous composition, to felt and other material, for covering roofs, have been conducted as several distinct operations, chiefly by hand-labor, and more or less imperfect and incomplete, owing, among other causes, to the difficulty of keeping the composition in a uniformly plastic state, in consequence of irregularity in the heating, and its too rapidly cooling while being transferred from the kettle to the felt, and also to inequalities of thickness in the coating, arising from imperfect methods of spreading. Neither have the processes heretofore been done rapidly enough to be economical.

It is the object of my invention to overcome these objections, by conducting the processes of preparing, or "cooking" the composition, and applying it to the felt simultaneously, by means of one machine, or apparatus, securing thereby greater rapidity, and a better quality of work; and It consists in a mixing and cooking-vessel, and a delivery, or spreading-hopper, both surrounded by a steam-jacket, for keeping the same in a liquid state, and maintaining equable temperature, and of an endless apron, conveying the felt under the hopper as it is unwound from the roll, together with a sanding-box, for giving the final coating, as hereinafter described.

In the drawings—

A represents a vessel for mixing and thoroughly combining the ingredients of the composition by heat. Its walls are double, forming a jacket around it, into which steam is admitted, to maintain a uniform temperature sufficiently high to liquefy the bituminous portion of the ingredients.

This vessel is provided with a central vertical shaft, B, having two or more sets of arms, $b\ b$, for agitating the contents, the shaft being rotated by a belt from the driving-power, around the pulley C.

Steam is admitted by the pipe $c$; and the condensed water may be drawn off from the lower pipe $d$.

When thoroughly cooked, the composition is drawn, through the faucet $e$, into the hopper D.

This is also provided with a steam-jacket in the space $f\ f$, which surrounds it, the steam being supplied by the pipe $g$, which is preferably flexible, to admit of the removal of the hopper.

Underneath this hopper is a suitable bed, or table, over the surface of which moves an endless apron, $g'$, carried by the rollers H H, which may be driven by any suitable power.

The bearings $h\ h$ of one roller are adjustable by means of the set-screws $j\ j$, in order to keep the apron sufficiently taut.

Standards $k$ support a rod, L, on which the roll of felt rests, one end of which, being partially unrolled, is laid on the apron $g$, and carried under the hopper D, as the former is moved by the revolving rollers.

One side of the box is provided with a metallic blade, $i$, the angle of which may be adjusted by the set-screws $m$, to regulate the thickness of coating which the felt retains as it leaves the hopper, and give it a smooth and even surface.

As the whole upper surface of the felt is exposed to the composition while in a liquid state, bearing upon it with the weight of the superincumbent mass, it is pressed into close adhesion with the fibrous surface of the felt, and the coating is, in consequence, rendered more adherent and enduring, while the ease and rapidity with which it is applied, secure important advantages in its manufacture.

A sand-hopper, K, is provided, under which the freshly-coated felt is carried, and sprinkled by the sand, which falls through perforations in the bottom.

As the felt leaves the machine, it is conveyed by a succession of endless aprons, and laid upon the floor, or tables, remaining until the coating has hardened, when it may be removed and placed on reels for transportation and use.

The table G is a super-frame, which may be detached from the bed M of the machine, when required, for the cleaning, or renovation of the parts.

In the ordinary method of cooking these compositions, by kettles over the fire, the bituminous ingredients are liable to be burned, by the excess of heat, and the earthy ingredients congeal on the kettles in so hard a state, as to be removed only by the use of the cold-chisel, and with great loss of time and labor.

By cooking by steam in my improved apparatus, this difficulty is entirely obviated, as the heat is maintained at just the proper point throughout the mass, so that no burning or deposition occurs at any part, effecting a great saving of the time lost by renovating the kettles, and by the improved quality of the compound.

What I claim as my invention, and desire to secure by Letters Patent, is—

1. The mixing-reservoir, consisting of a vessel, A, provided with the rotating arms and steam-jacket, for preparing and maintaining plastic compositions for roofs in a state required for application to the felt or other material substantially as set forth.

2. Also, the combination of the mixing-vessel A, feeding-hopper D, sand-box K, endless apron $g'$, moving over the table G, arranged and operating substantially as and for the purposes set forth.

In witness whereof, I have hereunto signed my name, in the presence of two subscribing witnesses.

B. S. BROWN.

Witnesses:
KATE N. JONES,
J. FRASER.